Sept. 1, 1959
A. J. GRANGE
2,902,687
CONTROL SYSTEM
Filed Jan. 17, 1955
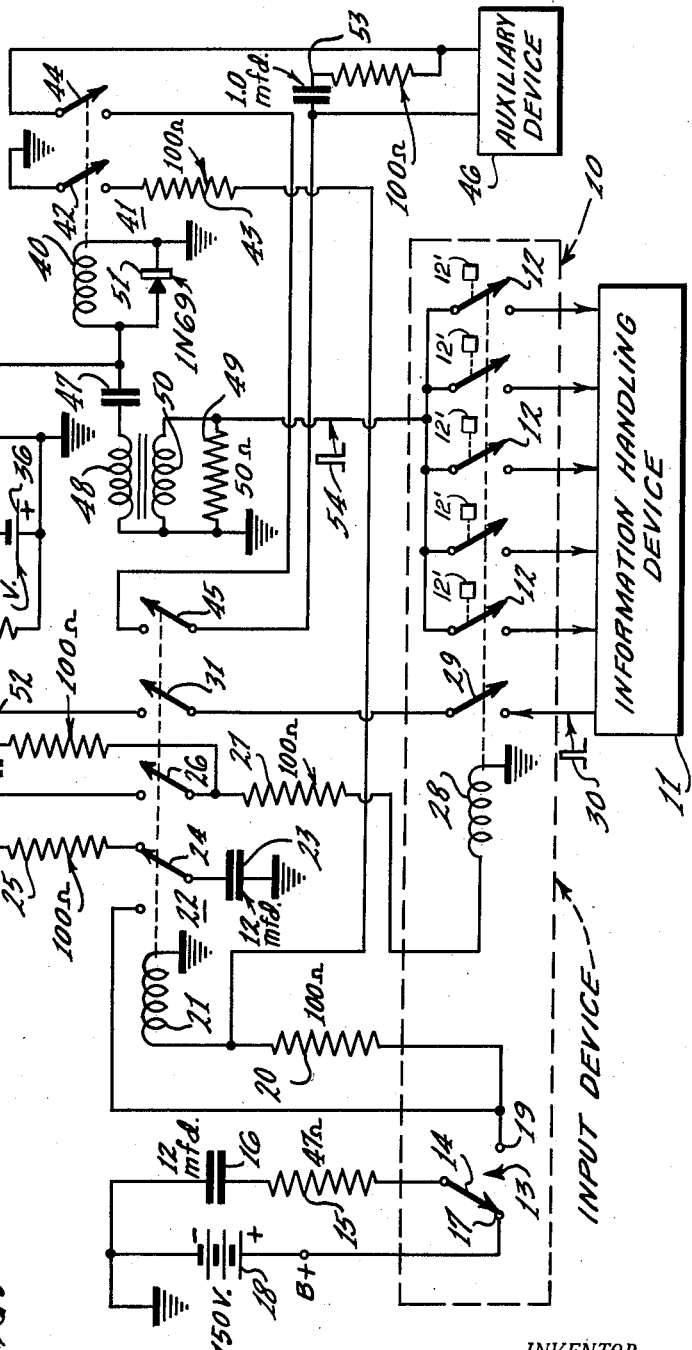
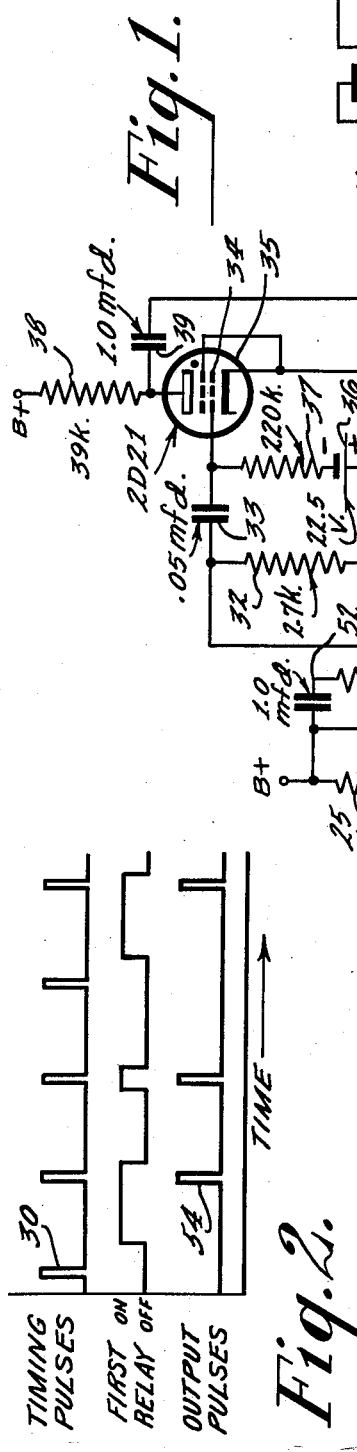
INVENTOR.
*Alban J. Grange*
BY
*Morris L. Rahtin*
ATTORNEY.

United States Patent Office 2,902,687
Patented Sept. 1, 1959

2,902,687
CONTROL SYSTEM

Alban J. Grange, Pennsauken, N.J., assignor to Radio Corporation of America, a corporation of Delaware Application January 17, 1955, Serial No. 482,064

6 Claims. (Cl. 340—345)

This invention relates to digital information handling systems and particularly to a system for controlling transfer of information from an aperiodically operated device to a periodically operated device.

The input device for an electronic digital computer may be electromechanical. For example, a keyboard device that is operated aperiodically is often employed. The computer, which may include a synchronous storage system such as a magnetic drum, is generally operated periodically. The information rates of such an input device and computer are, therefore, not compatible. A control system is required to transfer the information randomly supplied by the input device in synchronism with the periodic operation of the computer.

It is among the objects of this invention to provide:

A new and improved system for controlling the transfer of information from an aperiodic to a periodic device;

A new and improved system for controlling the transfer of information from an aperiodically operated electromechanical device to a periodically operated device;

A new and improved circuit for reliably controlling the transfer of information from a keyboard device to a periodic information handling device.

In accordance with this invention a control system is provided that receives a signal each time the input device is operated and also receives periodic signals from the information handling device. The control system includes a means responsive to a signal from the input device for completing two signal paths. One path passes the periodic signals to the control system, and the other is an information transfer path from the input device to the information handling circuit. The circuits are completed for a predetermined period at least equal to the time between the periodic signals. The control system also includes means responsive to a received periodic signal for generating a gating signal to complete the transfer of information from the input device to the periodic device. The gating signal generating means also operates to restore the path completing means to its initial condition.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a schematic circuit diagram of a control system embodying this invention; and Figure 2 is an idealized graph of the time relationship of operations occurring in the circuit of Figure 1.

In Figure 1, an input device 10 is shown which operates aperiodically to supply binary coded information to an information handling device 11. The input device 10 may be electromechanical, for example, any of the keyboard operated devices generally used in information handling systems. In such a keyboard device, the actuation of a key (not shown) initiates the closing of one or more code switches 12 by means of connections 12'. The combination of switches 12 that are closed provides a binary coded representation of the character represented by the actuated key, in a manner well known in the art.

The mechanical movement of a key (not shown) is employed to actuate a start switch 13 of the single-pole double-throw type. The pole 14 of the switch 13 is connected to a resistor 15 and capacitor 16 in series. The capacitor 16 is returned to a reference potential shown by the conventional ground symbol. The switch pole 14 in the unactuated position is connected through a fixed contact 17 to the positive terminal B+ of a source of direct voltage 18. The negative terminal of the source 18 is returned to ground. The other contact 19 of the start switch 13 is connected through a resistor 20 to the coil 21 of a first relay 22.

A second capacitor 23 is connected at one terminal to ground and at the other terminal through the pole of another switch 24 (in its "off" position) and a resistor 25 to B+. With the relay switch 24 in the "on" position, the capacitor 23 is connected through the resistor 20 to the relay coil 21 to provide a locking circuit. A second relay switch 26 is normally open and, when in the "on" position, connects B+ through a resistor 27 to a solenoid 28 in the input device 10. The solenoid 28 completes the closing of the code switches 12 which were actuated by the operation of a key (not shown). The solenoid 28 also closes another switch 29 in the input device 10 after the closing of the code switches 12 is completed.

One terminal of the switch 29 is connected to the information handling device 11 to receive periodically generated timing pulses 30 from that device 11. The information handling device, for example, may include a magnetic drum (not shown) which supplies a timing pulse upon each revolution of the drum in a well-known manner. The fixed contacts of the code switches 12 may be connected to information tracks on the drum. Appropriate magnetic drum systems that may be employed are well-known in the art.

The timing pulse switch 29 is connected through another normally-open switch 31 of the first relay 22 to a load resistor 32, which is returned to ground, and, also, through a coupling capacitor 33 to the control grid 34 of a thyratron 35. The negative terminal of a direct voltage biasing source 36 is connected through a resistor 37 to the thyratron grid 34. The positive terminal of the source 36 is returned to ground as are the cathode and screen grid of the thyratron 35. The anode of the thyratron 35 is connected through a resistor 38 to B+. In the normal biased-off condition of the thyratron 35, the resistor 38 provides a charging path for a capacitor 39 that is connected to one trminal of the coil 40 of a second relay 41. The other terminal of the coil 40 is returned to ground.

A normally-open switch 42 of the second relay 41 connects a resistor 43 across the first relay coil 21. A second switch 44 of the second relay is normally open and is connected in series with another normally-open switch 45 of the first relay 32 to an auxiliary control device 46 that may have its own power supply in series with the switches 44 and 45 for operating auxiliary equipment (not shown). The relay coil 40 is coupled through a capacitor 47 to the primary 48 of a pulse transformer, which is returned to ground. A load resistor 49 is connected across the transformer secondary 50 to ground. The transformer secondary 50 is also connected to the poles of the code switches 12. A diode 51 is connected across the second relay coil 40.

Capacitor-resistor series combinations 52 and 53 are connected across the switches 26 and 44, respectively, for arc suppression.

The switches are shown in Figure 1 in their normal position, which is when none of the keys (not shown) of the input device 10 are operated. Prior to operation of the input device keyboard, the first capacitor 16 is charged to B+ through the resistor 15 and the start switch 13 in series with the voltage source 18. The second capacitor 23 is also charged to B+ through the switch 24 and the resistor 25. Operation of a key in the input device 10 moves the start switch pole 14 to the other terminal 19 to complete a discharge circuit from the first capacitor 16 through the resistors 15 and 20 and the relay coil 21. The charge on the capacitor 16 is sufficient to energize the relay coil 21. The locking switch 24 is moved to the "on" position to discharge the capacitor 23 through the resistor 20 and the relay coil 21. The discharge of the second capacitor 23 maintains the relay coil 21 energized for a predetermined period. The time constants of the capacitor discharge circuits are such that the relay coil 21 remains energized for a period greater than the time between successive timing pulses 30 supplied by the information handling device 11. An appropriate period of energization of the first relay coil 21 is about half again as long as the period between timing pulses 30.

Energization of the relay coil 21 completes a circuit through the switch 26 from B+ to the solenoid 28 in the input device 10. The energized solenoid 28 completes the closing of the code switches 12 and also closes the timing pulse switch 29. The solenoid may be employed to maintain the operated key depressed and lock the keyboard to prevent any further operation before a cycle of the control system is completed. The first timing pulse 30 that is supplied by the information handling device 11 after the switch 29 is closed is passed by the closed switches 29 and 31 and applied to the grid 34 of the thyratron 35 to fire that tube 35.

Prior to the firing of the thyratron 35 the capacitor 39 is charged to B+ by way of the resistor 38 and a relay coil 40. The charging current is sufficiently small to prevent actuation of the relay 41. When the thyratron 35 fires, the charge on the capacitor 39 is applied directly across the relay coil 40, the voltage drop in the conducting tube 35 being negligible. The resulting current is sufficient to energize the relay coil 40 momentarily during the time the capacitor charge is being dissipated. The resistor 38 is made sufficiently large so that the thyratron 35 is extinguished upon discharging the capacitor 39. The voltage pulse appearing across the relay coil 40 upon discharge of the capacitor 39 is differentiated by the transformer 48 and capacitor 47 combination to provide a pulse of sharp rise time and short duration. The diode 51 clamps the voltage across the coil 40 to ground to prevent overshoot. The resulting output pulse 54 appearing across the load resistor 49 is applied as a gating pulse to the poles of the code switches 12 and transmitted through those of the switches 12 that are closed to the information handling device 11. Thus, signals representing the particular code combination that corresponds to the actuated key (not shown) are applied in parallel to the information handling device 11.

When the second relay coil 40 is energized the switch 42 is closed and connects the relatively small resistance 43 across the coil of the first relay 21 as a shunt discharge path for the capacitor 23. The first relay coil 21 is deenergized, thereby opening the locking circuit through the switch 24 and, also, opening the energizing circuit for the solenoid 28 through the switch 26. When the solenoid 28 is deenergized, the operated key on the keyboard is permitted to return to its normal position and the code switches 12, the timing pulse switch 29, and start switch 13 are all opened. The keyboard may be operated again at this time, and the described cycle of operation is repeated.

The operation of the input device 10, which closes the switch 13, may occur at any time with respect to the occurrence of the timing pulses 30. Various time relationships are indicated in the idealized graph of Figure 2 in which energization and deenergization of the relay coil 21 are indicated as "on" and "off," respectively. Although the input device 10 is randomly operated, information is supplied to the information handling device 11 only when it is ready to receive the information, which is when a timing pulse 30 is supplied. The gating pulses 54 are generated synchronously with the timing pulses 30. Therefore, the information is transferred to the device 11 in synchronism with the operation of that device 11.

The first relay 21 remains "on" for varying time periods depending on when the next timing pulse 30 is received. If the relay 21 is "off" when a timing pulse 30 is supplied, the switch 31 is open, and the pulse 30 does not fire the thyratron 35. The switch 29 is closed only after the code switches 12 are closed ensuring that each gating pulse 54 that is generated is passed by properly closed switches 12, and that only one pulse 54 generated by tube 35 passes the coded switches 12 for each operation of a key each operation of switch 13). Due to the inertia of mechanical elements in the input device, the switches 29 and 12 may remain closed for some time after the relay 22 is turned "off." During this time, the open switch 31 prevents a timing pulse 30, which can pass the closed switch 29, from firing the thyratron 35.

If a timing pulse 30 is not supplied by the device 11 for some reason, the capacitor 23 discharges and the relay coil 21 is deenergized. The switch 26 is opened to break the energizing circuit of the solenoid 28. In this way, large-current energization of the solenoid 28 for an extended period is prevented to avoid damage that might otherwise occur.

An appropriate form of keyboard mechanism that may be employed is described in the copending patent application by Baer et al., "Keyboard Mechanism," Serial No. 474,934, filed December 13, 1954. The control system may also be employed with other types of input devices. For example, the input device may be a punch card reading mechanism in which movement of the card may be employed to actuate the start switch 13, and the code switches 12 may be the hole-sensing contacts of such a reading mechanism. The auxiliary control device 46 may be employed for actuating the advance mechanism for a punch card immediately after the information is transferred to the information handling device.

The specific circuit components given in Figure 1 are illustrative and are not to be construed as a limitation on the scope of the invention. These specific circuit values are applicable to a timing-pulse repetition rate of 10 pulses per second.

Thus, it is seen that a new and improved system is provided for controlling the transfer of information from an aperiodic input device to a periodic information handling device. The random time at which information is supplied is reconciled with the precise time it must be transferred to the information handling device. The control system is simple and ensures reliable operation.

What is claimed is:

1. In an information handling system in which a first device is aperiodically operated to supply information to a second device that operates periodically to receive the supplied information and to supply signals when ready to receive said information, the combination with said first and second devices of a control system comprising pulse signal generating means, a first and a plurality of second signal paths between said second device and said pulse signal generating means, means responsive to the operation of said first device for completing said signal paths for a predetermined time period greater than the time between successive ones of said periodic signals, said signal generating means being responsive to receipt of said periodic signals received by way of said first signal path for supplying pulse signals to be transferred by way of said second signal paths, and means responsive to one of said pulse signals from said signal generating means for opening said signal paths, whereby one and only one of said pulse signals passes said second signal paths for any one operation of said first device path completing means in a condition to open said signal paths.

2. In an information handling system, a control system as recited in claim 1 wherein said path completing means includes means for completing different combinations of said second signal paths in accordance with the operation of said first device.

3. In an information handling system in which a first device is aperiodically operated to supply information to a second device that operates periodically to receive the supplied information and to supply signals when ready to receive said information, the combination with said first and second devices of a control system comprising signal generating means, a first and a plurality of second signal paths between said second device and said signal generating means, means responsive to the operation of said first device for completing said signal paths for a predetermined time period greater than the time between successive ones of said periodic signals, path completing means including means for completing different combinations of said second signal paths in accordance with the operation of said first device, said signal generating means being responsive to said periodic signals received by way of said first signal path for supplying signals to be transferred by way of said second signal paths, and means responsive to signals from said signal generating means for rendering said path completing means in a condition to open said signal paths, said path completing means including a first relay, and time constant means including a capacitor for energizing the coil of said relay in response to operation of said first device for said predetermined period.

4. In an information handling system in which a first device is aperiodically operated to supply information to a second device that operates periodically to receive the supplied information and to supply signals when ready to receive said information, the combination with said first and second devices of a control system comprising signal generating means, a first and a plurality of second signal paths between said second device and said signal generating means, means responsive to the operation of said first device for completing said signal paths for a predetermined time period greater than the time between successive ones of said periodic signals, said path completing means including means for completing different combinations of said second signal paths in accordance with the operation of said first device, said signal generating means being responsive to said periodic signals received by way of said first signal paths, and means responsive to signals from said signal generating means for rendering said path completing means in a condition to open said signal paths, said path completing means including a first relay, and time constant means including a capacitor for energizing the coil of said relay in response to operation of said first device for said predetermined period, wherein said relay includes a first switch, and said path completing means further comprises a solenoid, said first switch controlling the energization of said solenoid, said first and second signal paths including separate switches controlled by said solenoid.

5. In an information handling system, a control system as recited in claim 4, wherein said first relay includes a second switch connected in a series circuit with said first signal path switch.

6. In an information handling system, a control system as recited in claim 4 wherein said signal generating means includes a grid-controlled gas discharge tube having its grid coupled to said first signal path switch, and means coupling an electrode of said tube to said second signal path switches, and said means for rendering said path completing means in a condition to open said signal paths includes a second relay having its coil connected to be momentarily energized when said tube is rendered conductive, a switch of said second relay being connected in shunt with said first relay coil.

References Cited in the file of this patent
UNITED STATES PATENTS

| | | |
|---|---|---|
| 2,090,103 | Bryce | Aug. 17, 1937 |
| 2,178,951 | Bryce | Nov. 7, 1939 |
| 2,317,995 | Krum | May 4, 1943 |
| 2,558,187 | Marrison | June 26, 1951 |
| 2,597,866 | Gridley | May 27, 1952 |
| 2,718,633 | Fennessy | Sept. 20, 1955 |